United States Patent [19]

Beall et al.

[11] Patent Number: 5,328,613
[45] Date of Patent: Jul. 12, 1994

[54] POLYMER MEMBRANES FOR SEPARATION PROCESSES

[75] Inventors: George H. Beall; Kishor P. Gadkaree, both of Big Flats; Thomas P. Grandi, Elmira; Candace J. Quinn, Corning, all of N.Y.

[73] Assignee: Corning Incorporated, Corning, N.Y.

[21] Appl. No.: 6,964

[22] Filed: Jan. 21, 1993

Related U.S. Application Data

[62] Division of Ser. No. 808,814, Dec. 17, 1992, Pat. No. 5,183,607.

[51] Int. Cl.$^5$ .............. B01D 71/06; B01D 71/64; B01D 71/68
[52] U.S. Cl. .............. 210/500.27; 210/500.39; 210/500.41
[58] Field of Search .............. 204/252; 210/500.27, 210/500.39, 500.41, 321.75, 321.84; 264/41, 45.1, DIG. 48, DIG. 62

[56] References Cited

U.S. PATENT DOCUMENTS

4,755,540 7/1988 Blakey ........................ 204/252

*Primary Examiner*—Frank Sever
*Attorney, Agent, or Firm*—Kees van der Sterre

[57] ABSTRACT

Semi-permeable microporous polymer bodies, such as porous plates or membranes for separation processes, are provided, these being made of durable high-temperature thermoplastics, eg., a liquid crystal polymer, by a process comprising melt-mixing the polymer with high loadings of leachable glass and then leaching the glass from the polymer to leave a continuous relict polymer network, the network typically demonstrating pore volumes of 50 percent or more and average pore diameters in the 0.1–10 micron range.

9 Claims, 1 Drawing Sheet

POLYMER MEMBRANES FOR SEPARATION PROCESSES

This is a division of application Ser. No. 07/808,814, filed Dec. 14, 1992, now U.S. Pat. No. 5,183,607.

BACKGROUND OF THE INVENTION

The present invention relates to polymer membranes for separation processes, and more particularly to polymer membranes for pressure-driven separation processes or the like which may be formed using high temperature polymers offering excellent physical and chemical durability.

Filtration and/or separation processes may be grouped into three separate classes or categories. These include concentration-driven separations, represented by processes such as dialysis, electromembrane separations, used to separate dissolved charged ions, and pressure-driven separations which include the more familiar processes of micro-filtration and ultra-filtration.

Pressure-driven processes achieve the separation of suspended or dissolved particles of different sizes as the result of the capability of the particles to penetrate through or be retained by semi-permeable porous membranes of varying permeabilities and porosities. The porosity of the membrane determines whether the separation is termed micro-filtration, ultra-filtration or hyper-filtration.

Polymer membranes are used on a large scale in many industrial processes. Applications for such membranes include the desalination of sea water, the cleaning of industrial effluents, the fractionation of macro-molecular solutions in the the food and drug industries, and the controlled release of drugs in medicine. Membrane separations are in many cases faster, more efficient, and thus more economical than conventional separation techniques.

Micro-filtration membranes are used for the filtration of particles in the 0.1–2 micron size range, whereas ultra-filtration membranes can trap particles in the 0.001–0.1 micron size range. Typical species separable by micro-filtration include pollen, blood cells, and bacteria, the latter in some cases having particle sizes down to about 0.2 microns. Ultra-filtration membranes can retain species such as DNA, virus particles, and Vitamin B12 (with a particle size of about 30 Å).

Composite membranes are also known, a common example being asymmetric ultrafiltration membranes. These structures comprise a thin particle-selective skin layer or surface membrane of very fine porosity disposed for physical support on a substructure or backing plate of coarser porosity. Composite membranes of this type improve mass transport in processes such as ultra-filtration and reverse osmosis wherein very fine pore sizes must be provided.

Conventional methods for making microporous membranes include the sintered particle method wherein a fine powder of the selected membrane material is processed by sintering at temperatures just below the melting point of the powder. The sintered products are typically films or plates having thicknesses in the range of about 100–500 microns. Polymers such as polytetrafluoroethylene, ceramics, glasses, or even metals can be formed into microporous membranes by this technique.

The particle size of the powder is the main parameter determining the pore size of the final membrane in this method. A common characteristic of particle sintering, however, is that it generally yields structures of relatively low porosity, for example in the range of 10–40% by volume.

Several alternative methods for making microporous membranes from polymers have also been developed. One such approach, involves the stretching of a homogeneous polymer film to cause partial fracture of the film and the formation of a fine pore structure therein. Another technique involves irradiating a polymer membrane with charged atomic particles in a particle accelerator or reactor, and thereafter etching the irradiated membrane to enlarge the particle tracks therein to pores.

Still another process for microporous membrane manufacture is the so-called phase inversion process. In this process, an insoluble or immiscible species such as water is introduced into a thin liquid film of a polymer dissolved in an organic liquid. Polymer films precipitated from solutions in this way develop a network of more or less uniform pores due to the presence of the immiscible phase during the precipitation process.

As the above description suggests, many of the commercially important methods for membrane fabrication require the use of polymer solutions, or polymers that can be etched or otherwise dissolved in controlled fashion. As a consequence, these methods are limited to polymers which have some solubility in organic solvents, a factor which significantly limits membrane durability.

It would be very useful if a method for manufacturing polymer membranes from more durable polymers could be developed, so that membranes exhibiting a higher level of chemical stability could be provided. Particularly useful would be a method for making such membranes from high strength, high temperature polymers such as polyether ketones, polyether ether ketones, and liquid crystal polymers.

Microporous polymer membranes having pore sizes in the 0.1–0.5 micron size range, if exhibiting porosities above 50% by volume, would obviously offer strong performance advantages over sintered polymer membranes of lower overall porosity. Applications for microporous membranes of this type, especially if offering the requisite high thermal and chemical stability, would include the sterilization of pharmaceutical drugs, the controlled release devices for drugs or herbicides, the removal of micro-organisms such as bacteria, yeast cells, or the like from aqueous solutions, and the filtration of organic or aqueous solutions of inorganic acids or bases which are often the byproducts of chemical processing in industries such as the electronics and chemical industries.

SUMMARY OF THE INVENTION

The present invention provides semi-permeable microporous membranes, plates, or other structures offering improved filtration, including micro-filtration, for a wide variety of applications wherein hostile treating conditions are present. The microporous bodies of the invention are formed of strong, chemically durable, high-temperature polymers and therefore offer substantially better physical and chemical durability than prior art membrane materials. Polymers which may be provided as microporous membranes in accordance with the invention particularly include such high-temperature polymers as polyether ketones, poly(aryl ether) ketones, polyether-ether ketones, polysulfones, polyether imides, and liquid crystal polymers. Also useful, particularly when used in combination with the above high temperature polymers, are fluoropolymers such as fluorinated ethylene propylene and polyfluoroalkoxy polymers.

In a first aspect, then, the invention includes a semipermeable microporous body such as a microporous membrane having a pore volume of at least about 50 volume percent and composed of a physically and chemically durable high-temperature polymer. The polymer can be any of a wide variety of high-transition-temperature thermoplastics, but will preferably consist essentially or at least predominantly of a material selected from polymer group consisting of polyether ketones, poly(aryl ether) ketones, polyether-ether ketones, liquid crystal polymers, polyether imides, polysulfones, and or copolymers, mixtures, or other combinations thereof. Good control over the pore diameters of the microporous bodies of the invention is possible; mean pore diameters can range from 0.1-10 microns, but with narrow size distributions in the 0.1-2 micron mean pore size range being readily attainable.

The microporous bodies of the invention are prepared from melt-blended mixtures of the polymers with suitable glasses; the glasses are then removed from the blended material by leaching to leave a relict porous polymer network. The glasses used will have transition temperatures in the same range as the transition temperatures of the polymers, so that intimate melt blending of the glass/polymer mixtures may be achieved. The glasses will in addition be chemically compatible with the polymers, for effective melt-blending therewith, and they will be leachable in aqueous media. By a leachable glass is meant a glass which can be substantially completely removed from a polymer network of appropriate structure by exposure of the glass to water or an acidic or basic aqueous solution.

In a second aspect, then, the present invention includes a method for making a semi-permeable microporous polymer body having an intercommunicating pore structure providing a pore volume of at least about 50 percent. That method comprises the steps of, first, melt-mixing a batch mixture of a finely divided high-temperature polymer and a finely divided leachable glass to form a two-phase glass-polymer blend. The blend formed by melt-mixing will generally comprise a continuous polymer network and an intercommunicating glass phase disposed therein, intercommunication of the glass phase being required in order to permit substantially complete removal of the glass by subsequent processing.

The blend thus provided is next formed into a glass-polymer body of a selected shape useful as a filtration medium or device. Thus the body may comprise a thin film, sheet, or other membrane form, or it may comprise a plate, tube, vessel or other shape useful as a filter or porous filter support.

The glass-polymer body thus provided is thereafter treated with aqueous media to leach the intercommunicating glass phase from the continuous polymer network therein. This is readily accomplished without disruption of the continuous polymer network, so that only a microporous polymer body remains after removal of the glass. This body will comprise an intercommunicating pore structure with average pore diameters typically falling in the range of about 0.1-10 microns. More preferably, microporous products with pore volumes of at least 70% and mean pore sizes in the microfiltration range of 0.1-2 microns will be provided.

DESCRIPTION OF THE DRAWING

The invention may be further understood by reference to the drawing wherein.

DETAILED DESCRIPTION

It is known that glass can be intimately blended with high temperature polymers to provide composite materials having properties intermediate those of the glasses and plastics. U.S. Pat. No. 5,043,369 to Bahn et al., for example, discloses glass/polymer composite materials comprising high temperature polymers melt-blended with low-transition temperature glasses which exhibit fine-grained microstructure and partial miscibility or interreaction between the polymers and the glass dispersed therein. The melt blends are made by high shear dispersive mixing of glass/polymer batches comprising finely divided glass and polymer batch materials, with the preferred mixing technique consisting of high shear screw-type extrusion such as provided by twin-screw extruders commonly used in the polymer industry.

The present invention utilizes composite materials made in a manner similar to that described in the Bahn et al. patent. However, to be useful in the present invention the polymer and glass batch materials selected must be of a character such that a continuous polymer network within the glass/polymer blend can be maintained. In addition, mixing conditions and a glass-/polymer volume ratio adequate to develop such a network, and to form the essential interconnecting dispersion of the glass in the polymer, are required.

The volume fraction of soluble glass in the mixture must be high in order to achieve high porosity in the membrane and a continuous rather than non-continuous pore structure therein. We typically employ the glass in proportions constituting about 65-95% by weight of the mixture with the polymer making up the remaining 5-35% by weight thereof. In addition, it is desirable that the glasses be non-wetting with respect to the polymers, so that spherical droplets of the glass are formed within the polymer during the mixing of the materials.

As previously noted, polymers offering the best combination of chemical compatibility, melt-mixing behavior, and durability needed for use in the invention include those such as polyether ether ketones, poly(aryl ether) ketones, polyether ketones, polyether imide, polyether sulfones (polysulfones), and liquid crystal polymers. These high-temperature polymers can be used alone or in combination, or they may be used with additions of other polymers such as fluoropolymers, provided only that sufficient polymer intercompatibility is present to provide for good polymer network formation during melt-mixing.

For best high temperature durability, the porous products of the invention are preferably composed at least predominantly (90 weight percent or more) of high-temperature polymers, with less durable polymers comprising only minor additions thereto. Most preferably, the products will consist essentially of high temperature polymers only, with little or no additions of other polymers.

The fibrous nature of many of the liquid crystal polymers appears especially suitable for the formation of the required continuous polymer network even at very high loadings of glass in the polymer. Examples of specific liquid crystal polymers particularly preferred for the manufacture of porous products in accordance with the invention include copolymerized p-hydroxybenzoic acid/hydroxynapthoic acid monomer mixtures, commercially available as Vectra liquid crystal polymers from the Hoechst-Celanse company of Shelby, N.C., and copolymers of terephthalic acid with p-p$^1$-dihydroxy biphenyl, p-hydroxy benzoic acid, commercially available as Xydar liquid crystal polymers from Amoco Performance Products company of Augusta, Georgia. These polymers can have heat distortion temperatures as high as 640°–670° F. and strengths in excess of 18,000 psi.

Table I below sets forth physical properties for the primary polymers useful for the manufacture of microporous membranes or other products in accordance with the invention. The relatively high heat distortion temperatures and strengths of these polymers are apparent from the Table. Thus the advantages in physical durability offered by these polymers, even when compared with potential membrane polymers such as polytetrafluoroethylene (heat distortion temperature approximately 200° F.) and polycarbonate (heat distortion temperature approximately 270° F.) are substantial.

TABLE I

| Polymer Type | Durable Polymers | |
|---|---|---|
| | Heat Distortion Temperature (°F.) | Strength |
| Polysulfone | 340° | 5000–6000 psi |
| Polyether ketone (PEK) | 367° | 15,000 psi |
| Polyether-ether ketone (PEEK) | 320° | 10,000–15,000 psi |
| Liquid Crystal Polymers | 639–671° | 18,000–20,000 psi |

With respect to the selection of operable glasses for use in the invention, many of the glasses disclosed in the aforementioned Bahn et al. patent are glasses exhibiting high chemical durability. These are glasses which have been selected particularly to impart good weathering resistance and resistance to corrosive environments to the composite materials therein described.

The present invention requires instead the use of glasses exhibiting the quality of rapid dissolution in aqueous media. However, while high water solubility is desired for the glasses to be used, extremely non-durable glasses, such as for example glasses exhibiting hygroscopic behavior, are not preferred. These latter glasses, which spontaneously absorb water from the atmosphere, have a sticky character which makes them difficult to process. And, the presence of moisture at the melt-mixing stage of the manufacturing process used to make microporous products is undesirable.

An important property of these glasses in addition to their water high solubility is the viscosity of the glass at melt-mixing temperatures. As previously suggested, if the glass does not have a viscosity comparable to that of the high temperature polymer during mixing, high loadings of the glass in the polymer cannot be achieved, and therefore a glass loading sufficient to develop a continuous or interconnecting glass phase which can be removed from the polymer network by subsequent leaching cannot be realized.

This problem is most clearly exemplified by water-soluble non-glass solids such as sodium chloride, which could in principle also be removed from a polymer matrix by leaching to leave a porous polymer residue. However, solids of this type, which remain solid at polymer melting temperatures, cannot be successfully processed with the polymers at solids loadings much higher than about 30% by weight. This proportion of leachable material is well below that required to form a continuous network of leachable material in a durable polymer of the kind disclosed.

Examples of known glass families exhibiting both water solubility and low melting temperatures are the alkali phosphates, including the so-called metaphosphate and ultraphosphate glasses, as well as certain of the known borate, halide, oxyhalide, and halophosphate glasses. The alkali phosphates may be selected from a broad range of composition, including glasses comprising, in mole percent, about 35–70% $P_2O_5$, 25–65% $R_2O$, wherein R is at least one alkali metal selected from the group consisting of sodium, potassium and lithium, and 0–10% of oxides selected from the group consisting of $Al_2O_3$ and $B_2O_3$. Halophosphate glasses exhibiting particularly good solubility include those comprising, in mole percent, about 25–55% $P_2O_5$, 10–40% $R_2O$, wherein R is at least one alkali metal selected from the group consisting of sodium, potassium and lithium, and 10–40% $ZnCl_2$. The glass transition temperatures exhibited by these glasses can range from as low as 190° C. to 360° C. or higher.

A preferred family of glasses offering an excellent combination of water solubility and melt-mixing viscosity comprises selected alkali phosphate glasses having glass transition temperatures in the range of about 200°–350° C. Many of these glasses are non-hygroscopic yet relatively soluble in water or other aqueous media. They also demonstrate melt viscosities which are compatible with high temperature polymers such as the liquid crystal polymers.

Specific examples of the preferred glasses are alkali phosphate and aluminophosphate glasses having compositions comprising, in mole percent, about 40–55% $P_2O_5$, 45–55% $R_2O$ wherein R is at least one alkali metal selected from the group consisting of sodium, potassium and lithium, and 0–10% of $Al_2O_3$. Table II below sets forth examples of glass compositions of this type which exhibit appropriate solubility and viscosity characteristics for the manufacture of microporous membranes or the like in accordance with the invention. The compositions in Table IIa are reported in mole percent, together with the glass transition temperatures ($T_g$) for each of the glasses reported. Weight percent compositions are provided in Table IIb.

TABLE II

| | Leachable Alkali Phosphate Glasses | | | | |
|---|---|---|---|---|---|
| Oxide | 1 | 2 | 3 | 4 | 5 |
| Table IIa - Mole Percent Compositions | | | | | |
| $P_2O_5$ | 46.05 | 45.98 | 45.95 | 48.07 | 50.07 |
| $Al_2O_3$ | 3.98 | 4.04 | 4.03 | 1.99 | — |
| $Li_2O$ | 24.94 | — | 25.06 | 24.93 | 24.92 |
| $Na_2O$ | 25.03 | 24.98 | — | 25.01 | 25.01 |
| $K_2O$ | — | 25.00 | 24.96 | — | — |
| Table IIb - Weight Percent Compositions | | | | | |
| $P_2O_5$ | 70.7 | 60.2 | 65.0 | 73.1 | 75.5 |
| $Al_2O_3$ | 4.4 | 3.8 | 4.1 | 2.18 | — |

TABLE II-continued

| | Leachable Alkali Phosphate Glasses | | | | |
|---|---|---|---|---|---|
| Oxide | 1 | 2 | 3 | 4 | 5 |
| $Li_2O$ | 8.1 | — | 7.5 | 8.02 | 7.95 |
| $Na_2O$ | 16.8 | 14.3 | — | 16.63 | 16.49 |
| $K_2O$ | — | 21.7 | 23.4 | — | — |
| Tg(°C.) | 290° | 260° | 280° | 263° | 240° |

To provide intimate mixtures of the selected glass and polymer starting materials for melt-mix processing as herein described, finely divided glass and polymer batch materials are generally used. The exact form of the polymers and glasses is not critical, provided only that the batch mixture can be processed to develop the required polymer/glass microstructure within a reasonable processing interval. However, we prefer to used powdered polymer and powdered glass starting materials, and to intimately mix these powders to a homogeneous blend prior to heating the batch to final melt-mixing temperatures.

Both the high temperature polymers and the alkali phosphate glasses are readily available as powders. The polymers are generally commercially sold in powder or pellet form, while the glasses can easily be supplied as powders using known glass manufacturing techniques. To make such powders, the glasses are first melted following conventional glass practice, then rolled to form glass ribbon, and finally crushed and ground a desired particle size.

Glass particle sizes greater than a few millimeters are difficult to blend by high shear extrusion, whereas glass powders with particle sizes in the range of about 12-20 mesh (U. S. Standard Sieve) effectively provide polymer melt-blends with a very desirable dispersion of the glass phase within a relatively short processing interval. In handling the powdered glass, we have also found it useful to avoid moisture contamination of the powder during storage, and so we prefer to store the powders in moisture proof containers such as plastic bags to minimize the takeup of water. Further, for best processing, these glasses will be dried overnight at 150° C. or higher in a hot air oven just prior to mixing and forming the glass/polymer blends. The polymer powders should also be free of adsorbed moisture, and these may similarly be dried overnight in a hot air oven prior to use.

The melt-mixing and extrusion of glass-polymer blends such as employed herein may be accomplished by methods well known and described in the aforementioned Bahn et al. patent. Typically, high-shear mixing and extrusion, by means such as twin screw extruders or similar high-shear polymer blending equipment, is the best method for rapidly forming the intimate glass-polymer mixture since such can conveniently provide both high temperatures and high torque applied to the blends.

Of course, the volume fraction of porosity, the mean pore size, and the pore morphology of microporous membranes or other products produced as herein described will be found to depend not only upon the compositions of the polymer and glass, but also upon process parameters such as temperature and shear rate during extrusion. All of these factors can affect interactions between the polymer and glass during processing, and thus the microstructure of the blended material. For the particularly preferred glass/polymer systems hereinafter disclosed, extruder temperatures in the range of 350°-400° C. are most frequently employed, these temperatures yielding glass and polymer viscosities permitting though mixing and the development of a finely divided and fully dispersed interconnecting glass phase in the initial extrudate. However, the most favorable set of processing conditions for each material system to be used is best determined by routine experiment.

The actual forming of melt-blended glass/polymer extrudate into membranes, films, plates, hollow tubes or other structures suitable for filtration or filter support in accordance with the invention may be accomplished by any of the known techniques applicable to the forming of high temperature thermoplastic polymeric materials. Our preferred practice, however, is to produce the initial melt-blended material in extruded pelletized form, and then to utilize thermoforming processes such as pressing or re-extrusion to shape the melt-blended mixtures into the configurations desired for the filter medium to be fabricated.

Hot pressing constitutes a simple and effective method for forming thin-cross-section products from the pelletized melt-blended material. Again, temperatures in the 350°-400° C. range are sufficient to yield plates, sheets or membranes of reasonable quality for subsequent leaching, with pressing being carried out between rigid aluminum or steel plates coated with suitable mold release agents.

Removal of the glass phase from plates, films or other shapes provided as described is conveniently accomplished simply by contacting the selected shape with hot water or heated aqueous solutions. In general, strongly acidic or basic solutions are not required for glass removal, and thus will not often be used. Room temperature leaching is also effective, although slower than can be accomplished with boiling or nearly boiling media.

The invention may be further understood by reference to the following detailed examples showing the fabrication of microporous membranes in accordance therewith.

EXAMPLE 1

A phosphate glass having a composition, in mole percent, of about 70.7% $P_2O_5$, 16.8% $Na_2O$, 8.1% $Li_2O$ and 4.4% $Al2O_3$ is compounded and melted in a silica crucible at a temperature of about 1000° C. This batch provides a clear fluid glass melt.

The glass melt thus provided is formed into ribbon by rolling, and the rolled ribbon is then crushed and ground to a glass pewder of particle size below 20 mesh U. S. Standard Sieve (about 1.7 mm maximum particle size). Grinding is carried out under low humidity to avoid moisture absorption by the glass.

A liquid crystal polymer powder is next provided. The polymer selected is Xydar liquid crystal polymer, commercially available as a polymer powder from Amoco Performance Products company of Augusta, Ga.

A powder batch comprising the glass and polymer powders is next prepared by hand-mixing about 80 parts by weight the glass with about 20 parts by weight of the polymer. This mixture is loaded into an extruder for melt-blending. The extruder used is a conventional twin screw polymer extruder, except that it it fitted with supplemental heating means consisting of ceramic heating elements, so that extruder barrel temperatures of 400° C. and higher can easily be maintained.

Prior to loading the mixture into the extruder, the extruder is first purged with pure liquid crystal polymer to clean and wet the extruder barrel. Thereafter, while maintaining the extruder screw speed at 25 rpm and the barrel temperature at about 400° C., the glass polymer mixture is loaded, melt-blended, and extruded.

The extruded mixture thus provided is pelletized as extruded, and is then hot pressed at 400° C. between aluminum sheets coated with a silicone release agent. Hot pressing is carried out at a pressure sufficient to provide films of the extruded glass/polymer mixture having a thickness of about 5 mils.

The film produced as described is next leached in water at room temperature for about 16 hours, and thereafter dried at 100° C. until all water has been removed from the leached film. The resulting film is then examined by scanning electron microscopy and mercury porosimetry to determine the porosity and pore structure thereof.

Figure 1:
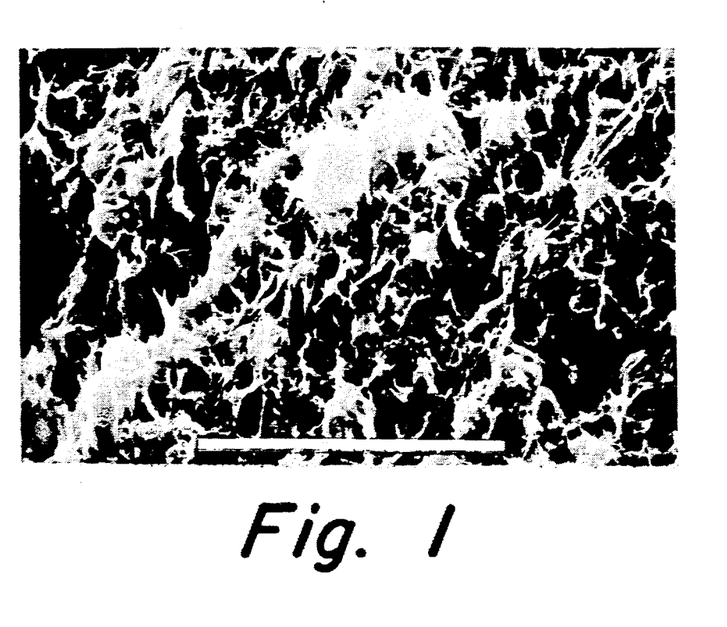
FIG. 1 is an electron photomicrograph of a glass-polymer body comprising a high-temperature polymer network incorporating an intercommunicating glass phase.

FIG. 1 of the drawing shows the structure of the pressed film produced in accordance with the above Example as it appears prior to the removal of the glass phase from the film by leaching. FIG. 1 is an electron photomicrograph of a fracture surface of the unleached film produced by film fracture after cooling under liquid nitrogen. The view is of the film cross-section, the white bar representing a dimension of 10 microns. The lighter web-like structure in the photomicrograph is the network of polymer material, whereas the glass phase appears in the form of dark grey, spherulized inclusions in the polymer.

Figure 2:
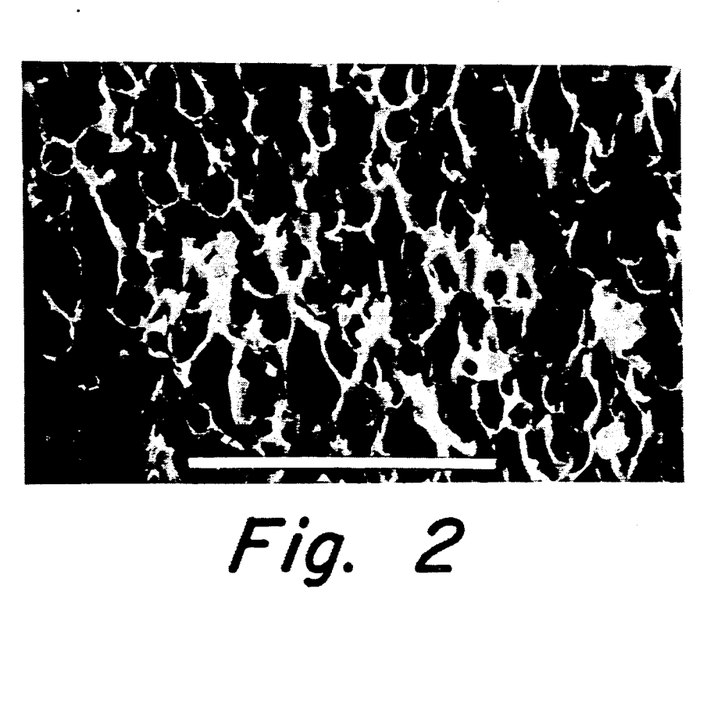
FIG. 2 is an electron photomicrograph of a microporous polymer body produced by glass removal from a glass-polymer body of the type shown in FIG. 1.

FIG. 2 of the drawing is a similar electron photomicrograph taken of the film cross-section after the glass phase has been removed from the film by leaching. Again, the white bar in the photomicrograph represents a dimension of 10 microns. As is evident from a study of FIG. 2, the polymer component of the starting mixture has been retained as a continuous polymer network despite the high percentage of glass in the film. The fact that leaching has removed all of the glass throughout the thickness of the film demonstrates that the spheruiized glass phase shown in FIG. 1 did not comprise isolated glass inclusions in the polymer.

The porosity indicated in FIG. 2 of the drawing is further characterized by mercury porosimetry measurements. The results indicate a mean pore diameter of about 0.34 microns for the film of the Example. Also, the pores are reasonably uniform in size, the largest pores observed having diameters not exceeding about 2.5 microns. The uniform intercommunicating porosity extending through the entire thickness of the film indicates good film functionality as a strong, thermally durable micro-filtration membrane.

EXAMPLE 2

The procedure of Example 1 is repeated except that a glass/polymer mixture containing only 10% by weight of the liquid crystal polymer and 90% by weight of the glass is used in the melt-blending and film forming process. Again, melt-blending is carried out under the extruder operating conditions described in Example I, and a similar pelletization and hot-pressing process is followed.

Even at this high glass loading, the polymer film exhibits a continuous porous network structure after leaching of the glass therefrom. A mercury porosimetry study of the leached film places the pore volume thereof at about 75 volume percent. The mean pore size is about 0.23 microns with pore diameters falling in the size range of 0.005–2.0 microns as determined by that method. This compares with a pore volume of about 70% for the film of Example 1, which also had a somewhat higher mean pore size (0.34 microns) and pore diameter range (0.001–2.5 microns). In each of Examples 1 and 2, however, the pore volumes achieved are well in excess of 50%, and thus well above the minimum pore volume needed for useful filtration or microfiltration performance.

EXAMPLE 3

The procedure of Example 1 is generally followed except that a polyether ether ketone (PEEK) polymer is combined with the selected alkali aluminophosphate glass. The PEEK polymer used is commercially available from ICI, Limited of the United Kingdom. The glass used has a composition, in weight percent, of about 60.2% $P_2O_5$, 21.7% $K_2O$, 14.3% $Na_2O$, and 3.8% $Al_2O_3$. A fine powder of this glass is thoroughly mixed with the PEEK resin in fine powder form, mixing being in a proportion providing about 70% by weight of powdered glass and 30% by weight of polymer.

The glass/polymer mixture thus provided is melt-mixed by extrusion as described in Example 1, the twin screw extruder operating at the same temperature and extrusion rate. The resulting extrudate is pelletized and the pellets are hot-pressed as described in Example 1 to provide glass/polymer film about 3 mils in thickness.

The film produced according to the above procedure is leached in water as in Example 1, and is then examined by electron microscopy. The pore structure of the leached film is similar to that obtained in Example 1, except that the bulk of the pores present in the film have diameters in the 5–10 micron range instead of the 1–2 micron range.

EXAMPLE 4

The procedure of Example 2 is generally followed utilizing the liquid crystal polymer therein described and an alkali aluminophosphate glass having the composition of Glass 3 in Table II. The glass/liquid crystal polymer powder batch again contains 90% by weight of glass and 10% by weight of polymer.

This batch is melt-blended under the same conditions as utilized in Example 1, then pressed to 5-rail film, and finally leached to provide a porous film. Microscopic examination of this film, however, shows a polymer structure which, although porous and continuous, is quite different from that of the film of Example 2. Hence the polymer network has a ribbon-like or flaky morphology, indicating that the glass did not form spherical particles of uniform size as in the case of the earlier example, and some large voids in the interior of the film are observed. Since the transition temperatures of the two glasses is similar, we attribute this result to a difference in compatibility between the polymer and the glass, perhaps caused by a difference in the wetting behavior of the glass under the melt-blending conditions employed. Similar film microstructure is observed when Glass 2 from Table II is used. Nevertheless, the pore volumes of these films are high, so that utility adequate for large particle macro-filtration separations is forseen.

EXAMPLE 5

As previously indicated, processing temperature can also have substantial effects on the pore structures of porous materials provided in accordance with the invention. Illustrating some of these effects, the procedure of Example 1 is repeated utilizing the same glass-/polymer mixture as therein described. However, melt-blending and extrusion of the powder batch is carried out at a reduced temperature of 360° C. instead of the previous 400° C.

Examination of leached porous film produced at this lower temperature indicates that a somewhat lower mean pore diameter (about 0.14 microns) and narrower pore size distribution (a pore size range of about 0.01–0.54 microns) have been achieved. In addition, the total porosity remains high at about 78% by volume. These results indicate not only the availability of narrow pore size distributions in accordance with the invention, but also the capability of producing a number of different porous products in the same composition system, simply by changing the melt-blending conditions employed.

EXAMPLE 6

The procedure of Example 1 is again generally followed except that a p-hydrobenzoic acid/hydronaphthoic acid liquid crystal polymer, commercially available as Vectra A-950 liquid crystal polymer from the Hoechst-Celanese company of Shelby, N.C., is used. The glass of Example i is used to prepare two different batch mixtures with this polymer, at glass loadings of 80% and 90% by weight.

Melt-blending and extrusion of powder mixtures of these materials are carried out at 360° C., and the pelletized extrudate is pressed to 5-mil films and leached as in Example 1. The microporous films produced from these batches exhibit pore sizes in the 1–20 micron size range, with some evidence of a fiber-like structure in the residual pores, particularly at the higher glass loading level. In the latter case, the pore shapes suggest that glass fibrils as great as 50–150 microns in length may exist in the melt-blended material prior to leaching.

We attribute these results to the relatively high viscosity of the glass at the lower processing temperatures used, and to the tendency of this particular liquid crystal polymer to itself form fibrils when stretched at high temperatures. Thus when the same LCP polymer is processed with softer Glass 4 of Table II at a glass loading of 20% by weight and an extrusion temperature of 360° C., the leached film exhibits much finer and more uniform porosity. The pore volume of the latter film is 73%, with a mean pore diameter of 0.13 μm and a pore size range of 0.03–5 μm.

As previously indicated, polymer mixtures can also be used to provide porous bodies in accordance with the invention, and such mixtures can be used to great advantage for purposes such as improving the processability of the glass/polymer mixtures, tailoring the surface chemistry of the polymers, and improving the flexibilty and/or strength of the porous products without reducing the thermal stability thereof. Table III below sets forth some examples of porous films produced in general accordance with the procedure of Example 1, but made using polymer blends instead of single polymers.

Included in Table III for each of the blends described are an identification of the component polymers and the relative proportions thereof in each film, an identification of the glass used for melt-blending (from Table II above) and the proportion thereof employed in the batch, and the melt-blending temperature used for processing the glass/polymer batches. Also reported are the volume percent of porosity, mean pore size, and pore size ranges observed in the resulting thin film products, as determined by mercury porosimetry measurements.

TABLE III

| Run No. | Polymer Mix | Glass | Extr. Temp. | Pore Vol. | Pore Mean Diam. | Pore Size Range |
|---|---|---|---|---|---|---|
| 7 | LCP$^1$- 18% PAEK- 2% | Glass 1 80% | 400° C. | 82% | 0.14 μm | 0.004–4 μm |
| 8 | LCP$^1$- 18% pSul- 2% | Glass 1 80% | 400° C. | 83% | 0.21 μm | 0.005–3 μm |
| 9 | LCP$^1$- 10% pSul- 10% | Glass 1 80% | 400° C. | 78% | 0.45 μm | 0.004–104 μm |
| 10 | LCP$^2$- 18% pSul- 2% | Glass 1 80% | 360° C. | 70% | 0.20 μm | 0.05–0.56 μm |
| 11 | LCP$^1$- 15% pSul- 15% | Glass 1 70% | 400° C. | 70% | 0.29 μm | 0.004–14.3 μm |
| 12 | LCP$^2$- 15% | Glass 4 80% | 360° C. | 77% | 0.12 μm | 0.01–0.39 μm |

Polymer Key:
LCP$^1$ = Xydar$^{tm}$ liquid crystal polymer
LCP$^2$ = Vectra$^{tm}$ liquid crystal polymer
pSul = polysulfone polymer
PAEK = Kadel$^{tm}$ poly(arylether ketone) polymer While the pore diameters of the porous polymer bodies above described is generally somewhat above the ultra-filtration pore size range of 0.001–0.1 μm, these bodies offer significant advantages when used as porous plates or other underlying structures for the support of porous polymer films having fine pores sizes suitable for ultra-filtration separations. The following example describes the preparation of such an ultra-filtration device.

EXAMPLE 13

A porous liquid crystal polymer (LCP) film produced as described in Example 1, having a mean pore diameter of approximately 0.2 microns and a pore volume of about 70%, is provided with a microporous surface film of very fine porosity by a phase inversion technique. This surface film, composed of a polyvinylidene fluoride (PVDF) polymer, is deposited from a 17% (weight) solution of PVDF in acetone applied at a temperature of 50° C. by dipping. The LCP film is first dipped into the polymer solution for 2–3 seconds, and is then withdrawn and briefly immersed in a 70/30 (volume percent) water/acetone mixture to introduce an aqueous phase into the previously applied polymer solution layer.

After drying the LCP film thus treated, a PVDF polymer surface film exhibiting very fine porosity (pore diameters being in the range of about 0.02 μm in diameter) is developed. This film is integrally bonded to the LCP film, such that a composite structure well suited for ultra-filtration at ambient or elevated temperatures is provided. Hence, the high temperature and high strength characteristics of the LCP polymer support substantially improve the utility of the PVDF surface film as a filter.

while the invention has been particularly described above with respect to specific materials and specific procedures, it will be recognized that those materials and procedures are presented for purposes of illustration only and are not intended to be limiting. Thus, for example, porous membranes could also be provided through the leaching of an intercommunicating glass phase from a polymer body formed from ordinary commodity or engineering thermoplastic polymers, if desired. Examples of such polymers include polycarbonate, polyamide, and polyolefin plastics. The key requirement in these cases would be to provide chemically compatible glasses exhibiting sufficiently low softening temperatures to provide viscosity compatibility with these polymers at melt mixing temperatures below the selected polymer decomposition temperature.

Examples of particularly low-melting glasses known to the art include the alkali metaphosphate, alkali ultraphosphate, borate, halophosphate, and certain halide and oxyhalide glasses. We expect that melt-mixing compatibility between these glasses and soft thermoplastics could well provide the intercommunicating glass phase necessary for the development of a continuous polymer network, such a network also offering excellent polymer membrane performance after chemical removal of the glass as hereinabove described.

We claim:

1. A semi-permeable microporous polymer body having a pore volume of at least about 50 volume percent and a mean pore diameter in the range of about 0.1–10 microns which is composed at least predominantly of a high-temperature polymer selected from the group consisting of polyether ketones, poly(aryl ether) ketones, polyether-ether ketones, liquid crystal polymers, polysulfones, polyether imides, and mixtures, copolymers, or other combinations thereof, said body being made by a method comprising
   (i) melt-mixing a batch mixture comprising the high-temperature polymer and a finely divided leachable glass to form a two-phase glass-polymer blend comprising a continuous polymer network and an intercommunicating glass phase;
   (ii) forming the blend into a glass-polymer body of a selected shape; and
   (iii) leaching the intercommunicating glass phase from the glass-polymer body without disruption of the continuous polymer network.

2. A polymer body in accordance with claim 1 wherein the predominating high-temperature polymers are selected from the group consisting of poly(aryl ether) ketones, polyether-ether ketones, polysulfones, and liquid crystal polymers.

3. A polymer body in accordance with claim 2 which is a rigid porous plate.

4. A polymer body in accordance with claim 2 which is a flexible porous membrane.

5. A flexible porous membrane in accordance with claim 4 which has a pore volume of at least about 70% and a mean pore diameter in the range of about 0.1–2 microns.

6. A polymer body in accordance with claim 2 which consists essentially of high temperature polymers selected from the group consisting of poly(aryl ether) ketones, polyether-ether ketones, polysulfones, and liquid crystal polymers, and wherein liquid crystal polymers comprise at least about 50% by weight of the body.

7. A polymer body in accordance with claim 6 wherein the liquid crystal polymers are selected from the group consisting of p-hydroxybenzoic acid/hydroxynapthoic acid copolymers and terephthalic acid/p-p1 dihydroxy biphenyl-p-hydroxy benzoic acid copolymers.

8. A polymer body in accordance with claim 2 which consists essentially of liquid crystal polymers.

9. A polymer body in accordance with claim 1 which further includes a semi-permeable polymer film having a mean pore diameter in the range of about 0.001–0.1 microns disposed on at least a portion of the surface thereof.

* * * * *

UNITED STATES PATENT AND TRADEMARK OFFICE
CERTIFICATE OF CORRECTION

PATENT NO. : 5,328,613
DATED : July 12, 1994
INVENTOR(S) : George H. Beall, Kishor P. Gadkaree, Thomas P. Grandi and Candace J. Quinn It is certified that error appears in the above-indentified patent and that said Letters Patent is hereby corrected as shown below:

Col. 1, line 6, "14" should be "17"

Col. 5, line 12, "Hoechst-Celanse" should be "Hoechst-Celanese"

Col. 7, line 16, "used" should be --use--.

Col. 8, line 49 "pewder" should be "powder"

Col. 10, line 44, "5-rail" should be "5-mil"

Col. 11, line 25, "i" should be --1--.

Col. 12, Table III, last entry under column entitled "Polymer Mix", insert "PAEK-5%"

UNITED STATES PATENT AND TRADEMARK OFFICE
CERTIFICATE OF CORRECTION

PATENT NO. : 5,328,613
DATED : July 12, 1994
INVENTOR(S) : George H. Beall, Kishor P. Gadkaree, Thomas P. Grandi and Candace J. Quinn It is certified that error appears in the above-indentified patent and that said Letters Patent is hereby corrected as shown below:

Col. 12, line 58, "while" should be --While--.

Signed and Sealed this

Eighth Day of November, 1994

Attest:

BRUCE LEHMAN

*Attesting Officer*                *Commissioner of Patents and Trademarks*